United States Patent [19]

Parker et al.

[11] 4,433,872
[45] Feb. 28, 1984

[54] PRESSURE MODIFIED BRAKE ACTUATING PRESSURE PROPORTIONER

[75] Inventors: Donald L. Parker, Middletown; Hubert Hogg, Hamilton, both of Ohio

[73] Assignee: General Motors Corporation, Detroit, Mich.

[21] Appl. No.: 319,685

[22] Filed: Nov. 9, 1981

[51] Int. Cl.³ .............................................. B60T 8/22
[52] U.S. Cl. .................................. 303/22 A; 303/6 C
[58] Field of Search ............ 188/195; 303/6 C, 22 A, 303/22 R, 24 F

[56] References Cited

U.S. PATENT DOCUMENTS

| | | | |
|---|---|---|---|
| 3,504,698 | 4/1970 | Frill | 303/22 A X |
| 3,508,792 | 4/1970 | Bueler | 303/6 C |
| 3,712,684 | 1/1973 | Cordiano | 303/22 A |

Primary Examiner—Duane A. Reger
Attorney, Agent, or Firm—D. D. McGraw

[57] ABSTRACT

A load representative air shock absorber pressure system will add to the force exerted by the proportioner spring to increase the pressure point at which the proportioner begins proportioning operation in accordance with increase in vehicle load. Vents are provided to prevent the mixture of air and hydraulic brake fluid in the proportioner. The proportioner may be a part of the wheel cylinder assembly or may be installed in the master cylinder.

2 Claims, 3 Drawing Figures

PRESSURE MODIFIED BRAKE ACTUATING PRESSURE PROPORTIONER

The invention relates to a pressure proportioner for proportioning the brake pressure delivered to the rear wheel brakes of a vehicle. The proportioning action of the proportioner is modified by a fluid pressure which is variable in accordance with the loading of the vehicle. In the preferred embodiment illustrated, an air pressure shock absorber system provides pressure through a leveling valve to maintain the vehicle substantially level with changes in vehicle load. The air pressure provided to the air shock absorbers is used to modify the proportioner or proportioners for the rear wheel brakes. If hydraulic pressure leveling devices are used, the hydraulic pressure may be used to modify the proportioning action. Proportioners may be provided at each rear brake wheel cylinder. Alternatively, individual proportioners may be provided at the master cylinder brake pressure outlets for the rear brakes, or one or more proportioners may be provided in the rear brake line or lines. Individual wheel brake proportioners are required if separate brake pressure circuits are connected to the rear wheel brakes. Such an arrangement may be found in x-split brake systems, for example. In a brake system having a front-rear split arrangement, one proportioner may be used for all of the rear wheel brakes, or separate proportioners may be provided for each wheel brake.

IN THE DRAWING

Figure 1:
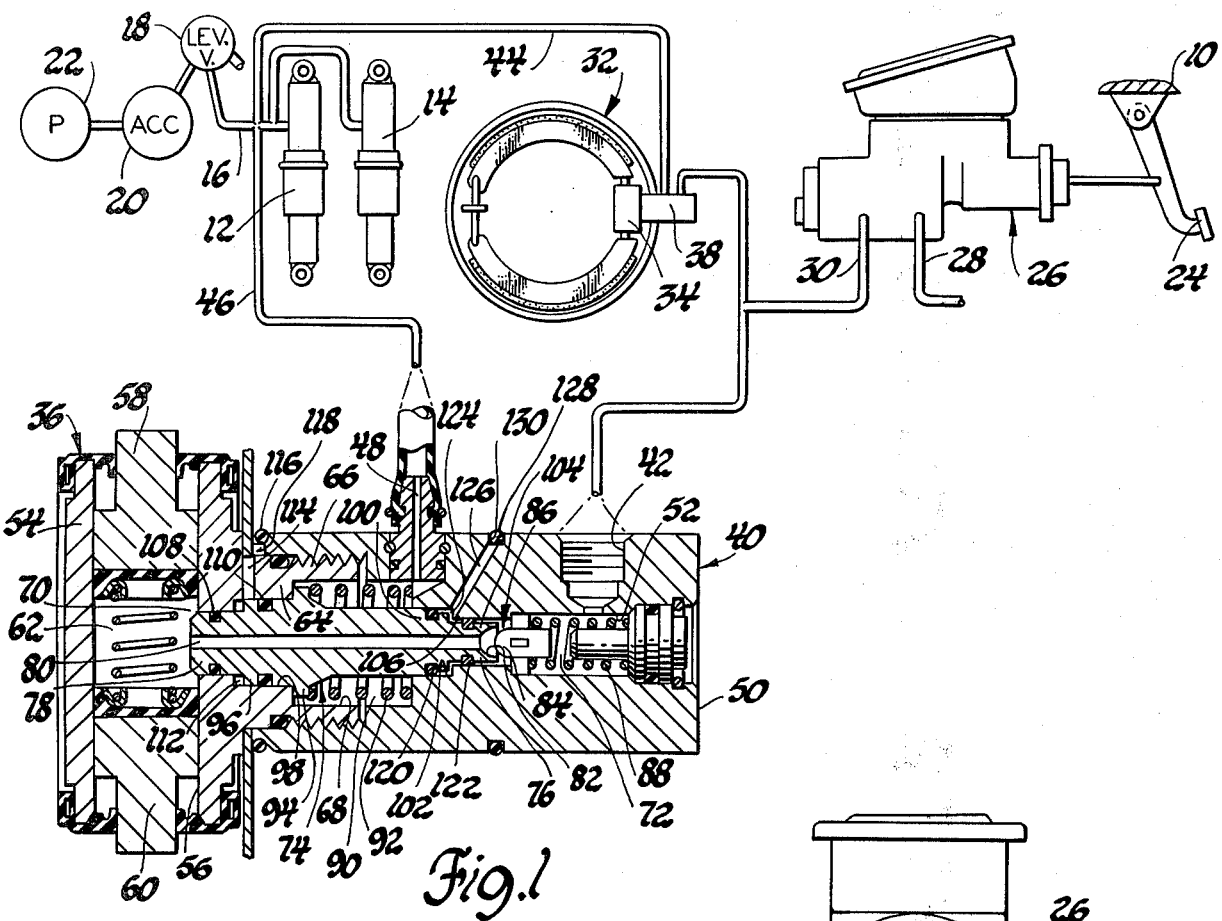
FIG. 1 is a schematic representation of a vehicle fluid pressure brake system and a fluid pressure leveling system, with parts broken away and in section. The brake system has proportioners embodying the invention and located at the rear brake wheel cylinders.

The vehicle 10 in which the systems shown in FIG. 1 are installed is illustrated as having air shock absorbers 12 and 14 supplied with air pressure through conduit 16 from a leveling valve 18, an air pressure accumulator 20 and an air pump 22. The general arrangement of this type of leveling system is well known and in common use on vehicles which are subjected to carrying variable loads over or near the rear axle. The vehicle 10 has a brake pedal 24 pivotally secured to a fixed portion of the vehicle and connected to operate a master cylinder 26. The master cylinder is illustrated as being of the dual pressure chamber type, with outlets connected to separate brake lines 28 and 30. The brake system illustrated is a front-rear split arrangement with brake line 28 connected to the front wheel brakes and brake line 30 connected to the rear brakes. An x-split system may be used in which brake line 28 connects to one rear wheel brake and one or both front wheel brakes, and brake line 30 connects to the other rear wheel brake and the other or both front wheel brakes. Assembly 32 is schematically illustrated and includes a wheel cylinder 34. Only the wheel cylinder 36 of the other rear wheel brake assembly is illustrated. The system of FIG. 1 also includes proportioners 38 and 40, located at the wheel cylinders 34 and 36 and embodying the invention claimed herein.

The brake line 30 has branches connected to the brake pressure fluid inlets of proportioners 38 and 40, with brake pressure fluid inlet 42 of proportioner 40 being illustrated. The air pressure conduit 16 has branch air lines 44 and 46 which are connected to air pressure inlets of proportioners 38 and 40. Air pressure inlet 48 of proportioner 40 is illustrated. The air pressure in air lines 44 and 46 is the same as found in the air chambers of shock absorbers 12 and 14 and therefore indicates vehicle load.

Wheel cylinder 36 and proportioner 40 are enlarged and shown in detail in FIG. 1. Since wheel cylinder 34 and proportioner 38 are identical to wheel cylinder 36 and proportioner 40, only one such arrangement will be described in further detail.

Proportioner 40 has a housing 50 in which inlets 42 and 48 are provided. A stepped bore 52 is formed through housing 50. The wheel cylinder 36 has a housing 54 with a bore 56 formed therethrough and containing wheel cylinder pistons 58 and 60. The wheel cylinder pressure chamber 62 is defined by the center portion of bore 56 and is between pistons 58 and 60. A transverse extension 64 from housing 54 provides a threaded mount 66 for proportioner housing 50 and has a stepped bore 68 formed therein communicating with chamber 62 and aligned with bore 52. Effectively the portion of wheel cylinder housing 54 forming extension 64 and having bore 68 therein forms a part of the total housing of proportioner 40 in cooperation with housing 50. Thus the end of bore 68 opening into chamber 62 provides a brake pressure fluid outlet 70 which will be further described. Bores 52 and 68 are so interrelated that they effectively combine to form the entire bore of proportioner 40.

A brake fluid inlet pressure chamber 72 is provided in a portion of bore 52 so that inlet 42 opens into that chamber. A differential area proportioning piston 74 is reciprocally received in the other end of bore 52 and through bore 68. One end 76 of piston 74 has a small effective area forming a movable wall of chamber 72. The other end of 78 of piston 74 has a larger effective area and forms a movable wall exposed to brake actuating pressure in chamber 62. A passage 80 extends through piston 74 to form a valve seat 82 at piston end 76. The other end of passage 80 opens through the brake pressure fluid outlet 70 into chamber 62. A proportioning valve member 84 is positioned in chamber 72 and cooperates with valve seat 82 to define the proportioning valve 86. Spring 88 is located in chamber 72 and holds valve member 84 in position.

A fluid pressure chamber 90 is defined by the end of bore 52 opposite chamber 72 and by a part of bore 68. The inlet 48 communicates with chamber 90 so that air pressure from air line 46 is maintained in that chamber. A spring 92 is located in chamber 90 and engages a flange 94 on piston 74 to urge that piston in a direction away from valve member 84. The portion 96 of piston 74 extending into bore section 98 is larger in diameter than the piston portion 100 extending into bore section 102. Thus piston 74 has an effective area exposed to pressure in chamber 90 so that the force generated by that pressure acting on the piston acts with spring 92. The piston portion 104, located in bore section 106 and forming piston end 76, is smaller in diameter than the area of piston end 78. Thus the input brake actuating pressure in chamber 72 acting on piston end 76 acts on a smaller area and in opposition to proportioner output brake actuating pressure in chamber 62. Seal 108 is provided on piston 74 near piston end 78 and seals against the wall of bore 68. Seal 110 is provided on piston portion 96 and seals against bore section 98. Vent space 112 is therefore provided in bore section 98 between seals 108 and 110. A vent passage 114 connects space 112 with atmosphere. An o-ring 116 is located in a recess 118 into which passage 114 opens. The o-ring acts as a check valve to allow venting while preventing dirt from entering passage 114.

Seal 120 is provided on piston portion 100 and seals against bore section 102. Seal 122 is provided on piston portion 104 and seals against bore section 106. Another vent space 124 is therefore provided between seals 120 and 122. A vent passage 126 vents space 124 to atmosphere. An o-ring 128 is located in recess 130 into which passage 126 opens. O-ring 128 acts as a check valve to permit venting of space 124 while preventing the entry of dirt.

The seals, vent spaces and passages assure the venting of any fluid such as air from chamber 90 or brake fluid from chambers 72 and 62 so that these fluids do not mix. This is particularly important when air and hydraulic brake fluid are the two fluids, or when any two different fluids are being used.

Figure 2:
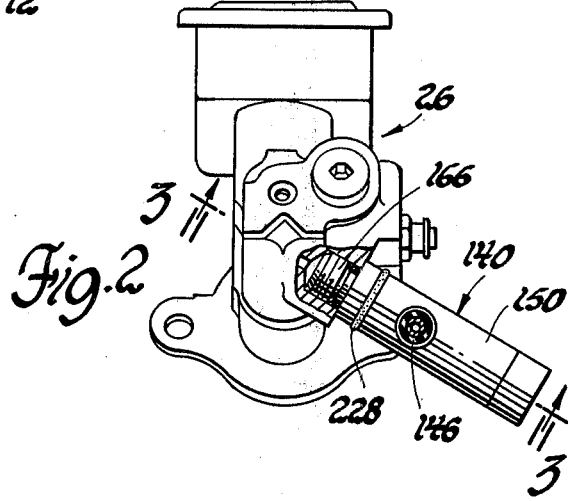
FIG. 2 is an end view of a master cylinder having a proportioner embodying the invention, the proportioner being installed at an outlet from the master cylinder leading to one or more rear brakes.
Figure 3:
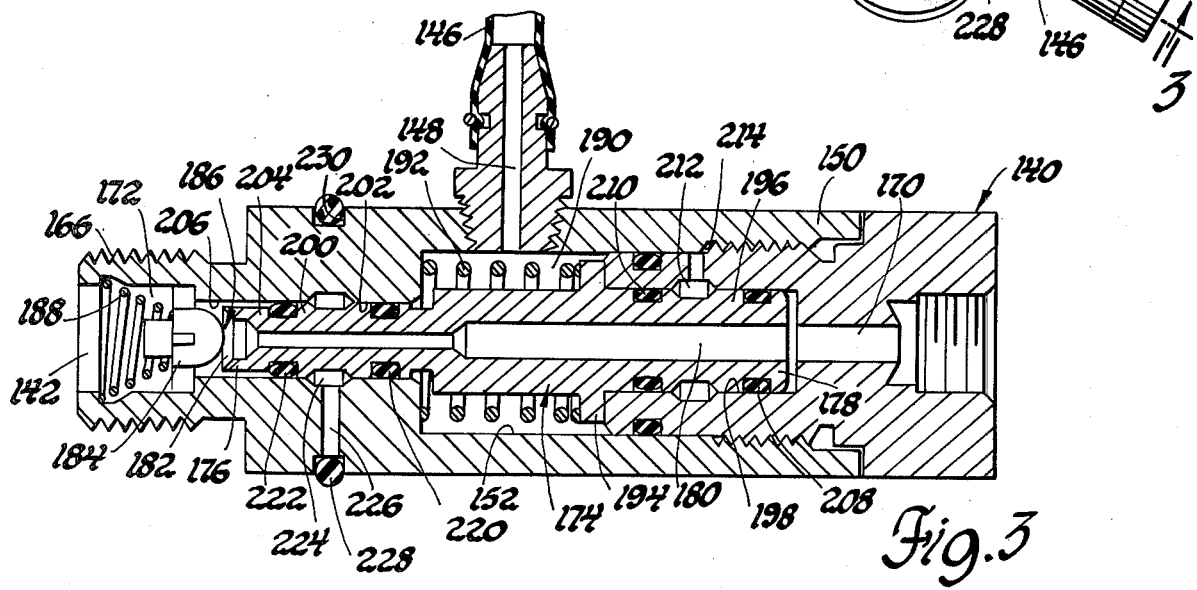
FIG. 3 is a cross section view of the proportioner of FIG. 2, taken in the direction of arrows 3—3 of that figure and having parts broken away.

FIGS. 2 and 3 show an arrangement wherein a proportioner 140 is installed in the outlet of the master cylinder assembly 26 to which the brake line 30 is connected. When the brake system has one brake line providing brake actuating pressure to both rear brakes, only one proportioner need be used. If the system is a x-split system, a proportioner 140 is provided for each rear wheel brake assembly. The arrangement may then be similar to that as shown in U.S. Pat. No. 4,213,655—Brademeyer, entitled "Master Cylinder Assembly and Brake System Incorporating Same." Only one proportioner 140 will be further described.

The proportioner 140 is threaded into master cylinder outlet. Proportioner 140 has a brake fluid actuating pressure inlet 142 which directly receives brake fluid from the master cylinder 26. Air line 146, similar to air line 46 of FIG. 1, is connected to the proportioner inlet 148. Proportioner housing 150 has the inlets 142 and 148 formed therein. A stepped bore 152 is formed through housing 150 with inlet 142 being at one end of the bore. The outer portion of housing 150 through which inlet 142 is formed is threaded as shown at 166 to provide for the mounting of the proportioner in the master cylinder. An outlet 170 is formed in housing 150 at the end of bore 152 opposite inlet 142.

A brake fluid inlet pressure chamber 172 is provided in housing 150 at inlet 142 so that the inlet opens directly into that chamber. A differential area proportioning piston 174 is reciprocally received in bore 152 intermediate inlet 142 and outlet 170. One end 176 of piston 174 has a small effective area forming a movable wall of chamber 172. The other piston end 178 has a larger effective area and forms a movable wall exposed to outlet brake actuating pressure at outlet 170. A passage 180 extends through piston 174 to form a valve seat 182 at piston end 176. The other end of passage 180 opens through piston end 178 and communicates with outlet 170. A proportioning valve member 184 is positioned in chamber 172 and cooperates with valve seat 182 to define the proportioning valve 186. Spring 188 is located in chamber 172 and holds valve member 184 in position.

A fluid pressure chamber 190 is defined by an enlarged center portion of bore 152. The inlet 148 communicates with chamber 190 so that air pressure from air line 146 is maintained in that chamber. A spring 192 is located in chamber 190 and engages a flange 194 on piston 174 to urge that piston in a direction away from valve member 184. The portion 196 of piston 174 extending into bore section 198 is larger in diameter than the piston portion 200 extending into bore section 202. Thus piston 174 has an effective area exposed to pressure in chamber 190 so that force generated by that pressure acting on the piston acts with spring 192. The piston portion 204, located in bore section 206 and forming piston end 176, is smaller in diameter than the area of piston end 178. Thus the input brake actuating pressure in chamber 172 acting on piston end 176 acts on a smaller area than does the proportioner output brake actuating pressure at outlet 170.

Seal 208 is provided on piston 174 near piston end 178 and seals against the wall of bore section 178. Seal 210 is provided on piston portion 196 and seals against the wall of bore section 198. Suitable grooves in the wall of bore section 198 and the wall of piston portion 197 define a vent space 212 between seals 208 and 210. A vent passage 214 connects space 212 with atmosphere, using as a part thereof the threaded assembly arrangement for portions of housing 150.

Seal 220 is provided on piston portion 200 and seals against the wall of bore section 202. Seal 222 is provided on piston portion 204 and seals against the wall of bore section 206. Another vent space 224 is provided between seals 220 and 222 by suitable grooves formed in the wall of bore section 202 and the wall of piston portion 200. A vent passage 226 vents space 224 to atmosphere. An o-ring 228 is located in a recess 230 formed on the outer part of housing 150. Passage 226 opens into recess 230 under o-ring 228. The o-ring therefore acts as a check valve to permit venting of space 224 while preventing entry of dirt. The seals, vent spaces and vent passages function in the same manner as the similar arrangement shown in FIG. 1 and described above.

When the vehicle is being operated while the brakes are released, the systems and the proportioners are in the condition shown in the drawing. Sufficient air pressure is maintained in the shock absorbers 12 and 14 to keep the vehicle level and that air pressure is maintained in the chamber 90 or 190. When the vehicle brakes are actuated, brake actuating pressure is generated in master cylinder 26 and delivered to the brake lines 28 and 30 of FIG. 1, or to similar outlets and brakes lines connected to master cylinder 26 and/or provide therein. Brake actuating pressure from the master cylinder is transmitted to chamber 72 or 172 and passes through valve 86 or 186 into passage 80 or 180. It acts on the piston end 76 or 176 and also on the piston end 78 or 178. It is also delivered to the rear wheel brake wheel cylinder through outlet 70 or 170. The differential area of piston 74 or 174 acted on by the pressure generates an effective force opposing the force of spring 92 or 192. At the predetermined pressure point which the proportioner is to become operative, this force is sufficient to overcome spring 92 or 192 and move valve seat 82 or 182 into a proportioning condition in cooperation with valve member 84 or 184. Thereafter, the outlet brake actuating pressure delivered to the rear wheel cylinders is a lesser proportioned value relative to the brake actuating pressure generated in the master cylinder.

It is desirable to increase the pressure point at which the proportioner begins proportioning operation as the load in the vehicle supported by the rear wheels is increased. Thus, for example, if additional load is added in the passenger compartment, trunk or station wagon load area, or in the truck body load area, the air pressure delivered to the shock absorbers 12 and 14 is increased to maintain the vehicle in a level condition. The air pressure in chamber 90 or 190 therefore increases and acts on a differential area of piston 74 or 174 in the same direction as spring 92 or 192. Thus additional force must be overcome by the brake actuating pressure acting on the differential area of the piston 74 or 174 before proportioning action begins. The pressure point at which proportioning action begins is therefore increased in accordance with the increase in vehicle load.

It is an important feature to prevent entry of any air from chamber 90 or 190 into the brake fluid system. Therefore air vent arrangemens are provided so that any leakage of air within the proportioner wil be vented to atmosphere. Similarly, any leakage of brake fluid will be vented to atmosphere. Even if hydraulic load sensing and accumulation is utilized in place of air, the hydraulic fluids are often different and should not be mixed. Therefore, it remains important to maintin total separation of the two systems.

The embodiments of the invention in which an exclusive property or privilege is claimed are defined as follows:

1. In a hydraulic brake pressure proportioner having a housing with a bore therein, a brake pressure inlet and a brake pressure outlet respectively communicating with opposite ends of said bore, a differential area proportioner piston reciprocably received in said bore, and spring means urging said piston in a non-proportioning direction and yielding under sufficient outlet brake pressure acting on said proportioner piston to permit piston proportioning action to proportion outlet brake pressure relative to inlet brake prssure, the improvement comprising:

a fluid pressure chamber positioned in said housing between said inlet and said outlet and defined by a part of said bore and a part of said piston, said piston having an effective piston differential area exposed to variable fluid pressure in said chamber to generate a force variable with said variable fluid pressure and acting with said spring means on said piston to increase the outlet brake pressure value at which said piston proportioning action can begin in accordance with the increase in fluid pressure in said chamber:

first and second vent means in said housing respectively between said chamber and said brake pressure inlet and said chamber and said brake pressure outlet;

and sealing means sealing said piston relative to said bore on each side of each of said first and second vent means;

said sealing means and said vent means assuring the venting of any fluid from said fluid pressure chamber or said brake pressure inlet or said brake pressure outlet and effectively preventing the mixture of any brake pressure fluid with any variable pressure chamber fluid.

2. In a brake pressure proportioner having a housing with a bore therein, a first fluid brake pressure fluid inlet and a first fluid brake pressure fluid outlet respectively communicating with opposite ends of said bore, a differential area proportioner piston reciprocably received in said bore, and spring means urging said piston in a non-proportioning direction and yielding under sufficient outlet brake pressure acting on said proportioner piston to permit piston proportioning action to proportion outlet brake pressure relative to inlet brake pressure, the improvement comprising:

a fluid pressure chamber having a second fluid variable pressure therein and positioned in said housing between said inlet and said outlet and defined by a part of said bore and a part of said piston, said piston having an effective piston differential area exposed to variable second fluid pressure in said chamber to generate a force variable with said variable fluid pressure and acting with said spring means on said piston to increase the outlet brake pressure value at which said piston proportioning action can begin in accordance with the increase in second fluid pressure in said chamber;

first and second vent means in said housing communicating with said bore respectively between said chamber and said brake pressure inlet and between said chamber and said brake pressure outlet;

and sealing means sealing said piston relative to said bore on each side of each of said first and second vent means; said vent means and said sealing means assuring the venting of any second fluid from said fluid pressure chamber or first fluid from said brake pressure fluid inlet or first fluid from said brake pressure fluid outlet, thereby effectively preventing the commingling of said first and second fluids in said chamber or in said brake pressure fluid inlet or in said brake pressure fluid outlet.

* * * * *